(12) United States Patent
Tanabe et al.

(10) Patent No.: US 8,358,627 B2
(45) Date of Patent: Jan. 22, 2013

(54) RADIO COMMUNICATION SYSTEM, RADIO COMMUNICATION METHOD, AND MOBILE STATION

(75) Inventors: Akimichi Tanabe, Kawasaki (JP); Minami Ishii, Yokohama (JP); Masashi Kanauchi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 290 days.

(21) Appl. No.: 12/674,384

(22) PCT Filed: Aug. 21, 2008

(86) PCT No.: PCT/JP2008/064911
§ 371 (c)(1),
(2), (4) Date: Feb. 19, 2010

(87) PCT Pub. No.: WO2009/025318
PCT Pub. Date: Feb. 26, 2009

(65) Prior Publication Data
US 2011/0268084 A1    Nov. 3, 2011

(30) Foreign Application Priority Data
Aug. 21, 2007 (JP) ............................... P2007-215311

(51) Int. Cl.
*H04W 4/00* (2009.01)
(52) U.S. Cl. ...................................... 370/331; 455/436
(58) Field of Classification Search .......... 370/331–333; 455/422.1, 436, 452
See application file for complete search history.

(56) References Cited

U.S. PATENT DOCUMENTS 6,205,128 B1   3/2001   Le
2002/0066011 A1   5/2002   Vialen et al.
2003/0129989 A1 *   7/2003   Gholmieh et al. ............ 455/452
2004/0002334 A1 *   1/2004   Lee et al. ...................... 455/436
2005/0282548 A1 * 12/2005   Kim et al. ..................... 455/436
2006/0160533 A1 *   7/2006   Chou et al. .................. 455/422.1

FOREIGN PATENT DOCUMENTS

| CN | 1256057 A | 6/2000 |
| JP | 2001-515689 | 9/2001 |
| JP | 2002-232930 A | 8/2002 |
| JP | 2004-515177 A | 5/2004 |

(Continued)

OTHER PUBLICATIONS

International Search Report w/translation from PCT/JP2008/064911 dated Nov. 25, 2008 (5 pages).
Written Opinion from PCT/JP2008/064911 dated Nov. 25, 2008 (3 pages).
3GPP TR 23.882 V1.9.0; "Report on Technical Options and Conclusions"; Mar. 2007 (183 pages).

(Continued)

*Primary Examiner* — Andrew Lai
(74) *Attorney, Agent, or Firm* — Osha Liang LLP

(57) ABSTRACT

A mobile station transmits mobile station capability information to a first radio communication system via a first radio connection set between the mobile station and the first radio communication system, before a disconnection of the first radio connection. The first radio communication system transmits the mobile station capability information to a second radio communication system, before the disconnection of the first radio connection. The second radio communication system transmits a parameter to the first radio communication system, before the disconnection of the first radio connection. The parameter is used in a second radio connection to be set between the mobile station and the second radio communication system. The first radio communication system transmits the parameter to the mobile station via the first radio connection, before the disconnection of the first radio connection.

7 Claims, 11 Drawing Sheets

FOREIGN PATENT DOCUMENTS

| | | |
|---|---|---|
| JP | 2006-033838 A | 2/2006 |
| JP | 2006-135991 A | 5/2006 |
| JP | 2007-013325 A | 1/2007 |
| JP | 2007-142590 A | 6/2007 |
| JP | 2007-151059 A | 6/2007 |
| JP | 2007-194749 A | 8/2007 |
| WO | 2006/052176 A1 | 5/2006 |
| WO | 2006/095652 A1 | 9/2006 |

OTHER PUBLICATIONS

Japanese Office Action for Application No. 2007-215311, mailed on Jan. 11, 2011 (4 pages).

Japanese Office Action for Application No. 2007-215311, mailed on Apr. 12, 2011 (4 pages).

Chinese Office Action with translation for Application No. 200880103818.9, mailed on Apr. 27, 2012 (14 pages).

* cited by examiner

RADIO COMMUNICATION SYSTEM, RADIO COMMUNICATION METHOD, AND MOBILE STATION

TECHNICAL FIELD

The present invention relates to a radio communication system, a radio communication method, and a mobile station for performing a handover from a first radio communication system to a second radio communication system.

BACKGROUND ART

With the recent development of radio communication technology, networks to which a mobile station can be connected are diversified into various kinds. Examples of the networks to which a mobile station can be connected include (1) a third-generation circuit switching domain (CS (Circuit Switching) domain), (2) a third-generation packet switching network (PS (Packet Switching) domain), (3) a next-generation packet switching network (EPC (Evolved Packet Core)), (4) a wireless LAN, and the like.

On the assumption that a mobile station can be connected to multiple networks, a technique of switching networks to which the mobile station is connected (handover technique) has also been proposed (for example, Non-Patent Document 1).

For example, in such a case as where radio quality is deteriorated in the network to which the mobile station is connected, the switching of networks (handover) described above is performed.

Non-Patent Document 1: 3GPP TR23.882 V1.9.0 (Section 7.8.2)

Here, the mobile station generally has one radio for setting a radio connection between the mobile station itself and the network. Specifically, since the mobile station has only one radio, the mobile station cannot connect simultaneously to more than one network.

Therefore, in the case of performing a handover from one network to another network, a radio connection set between the one network and a mobile station needs to be disconnected before a radio connection is newly set between the other network and the mobile station.

As described above, in the handover, a radio connection needs to be disconnected first, and then a new radio connection needs to be set from the beginning. This leads to lengthening of a period of time for which the radio connection is disconnected.

DISCLOSURE OF INVENTION

In an aspect, a radio communication system includes a first radio communication system, a second radio communication system and a mobile station connectable to the first radio communication system and the second radio communication system separately; the mobile station configured to perform a handover from the first radio communication system to the second radio communication system. The mobile station transmits mobile station capability information to the first radio communication system via a first radio connection set between the mobile station and the first radio communication system, before a disconnection of the first radio connection, the mobile station capability information indicating the capability of the mobile station in the second radio communication system. The first radio communication system transmits the mobile station capability information to the second radio communication system, before the disconnection of the first radio connection. The second radio communication system transmits a parameter to the first radio communication system, before the disconnection of the first radio connection, the parameter being used in a second radio connection to be set between the mobile station and the second radio communication system. The first radio communication system transmits the parameter to the mobile station via the first radio connection, before the disconnection of the first radio connection.

According to the first embodiment, in the case of performing a handover from the first radio communication system to the second radio communication system, the mobile station acquires a parameter (e.g., such as FRESH, MAC-I, UEA and UIA) used in the second radio connection in the second radio communication system, before the disconnection of the first radio connection in the first radio communication system.

Specifically, before the disconnection of the first radio connection, the security procedures are previously performed. Therefore, it is not required to perform the security procedures after the disconnection of the first radio connection. Thus, it is possible to shorten a period of time for which the radio connection is disconnected during the handover.

In the above described aspect, the mobile station measures radio quality of the second radio communication system, and then transmits the mobile station capability information to the first radio communication system together with a measurement report on the radio quality of the second radio communication system.

In the above described aspect, the mobile station measures radio quality of the first radio communication system, and then transmits a measurement report on the radio quality of the first radio communication system to the first radio communication system. The first radio communication system transmits, to the mobile station, a request for transmitting the mobile station capability information, in response to the measurement report on the radio quality of the first radio communication system.

In the above described aspect, the mobile station previously transmits the mobile station capability information before starting the handover. The first radio communication system transmits, to the second radio communication system, the mobile station capability information previously received from the mobile station in the handover.

In the above described aspect, the first radio communication system starts relocation processing in response to the measurement report on the radio quality of the second radio communication system, the relocation processing causing the second radio communication system to take over quality-of-service information indicating quality of service required for the communication already performed using the first radio communication system. In the relocation processing, the first radio communication system transmits the parameter to the mobile station together with a handover request to execute the handover.

In the above described aspect, the second radio communication system includes a circuit switching domain and a packet switching domain. The handover is a handover from the first radio communication system to the packet switching domain. Upon receipt of data via the packet switching domain, the mobile station starts a handover from the packet switching domain to the circuit switching domain.

In an aspect, a radio communication method is applied for a first radio communication system, a second radio communication system and a mobile station connectable to the first radio communication system and the second radio communication system separately and the radio communication, the method causing the mobile station to perform a handover from the first radio communication system to the second radio communication system. The method includes: transmitting mobile station capability information from the mobile station to the first radio communication system via a first radio connection set between the mobile station and the first radio communication system before a disconnection of the first radio connection, the mobile station capability information indicating the capability of the mobile station in the second radio communication system; transmitting the mobile station capability information from the first radio communication system to the second radio communication system, before the disconnection of the first radio connection; transmitting a parameter from the second radio communication system to the first radio communication system, before the disconnection of the first radio connection, the parameter being used in a second radio connection to be set between the mobile station and the second radio communication system; and transmitting the parameter from the first radio communication system to the mobile station via the first radio connection, before the disconnection of the first radio connection.

In an aspect, a mobile station is connectable to a first radio communication system and a second radio communication system separately, and which performs a handover from the first radio communication system to the second radio communication system. The mobile station includes a transmitting unit configured to transmit mobile station capability information to the second radio communication system via the first radio communication system, before a disconnection of a first radio connection set between the mobile station itself and the first radio communication system, the mobile station capability information indicating the capability of the mobile station itself in the second radio communication system; and a receiving unit configured to receive a parameter from the second radio communication system via the first radio communication system, before the disconnection of the first radio connection, the parameter being used in a second radio connection to be set between the mobile station itself and the second radio communication system.

BEST MODE FOR CARRYING OUT THE INVENTION

Figure 1:
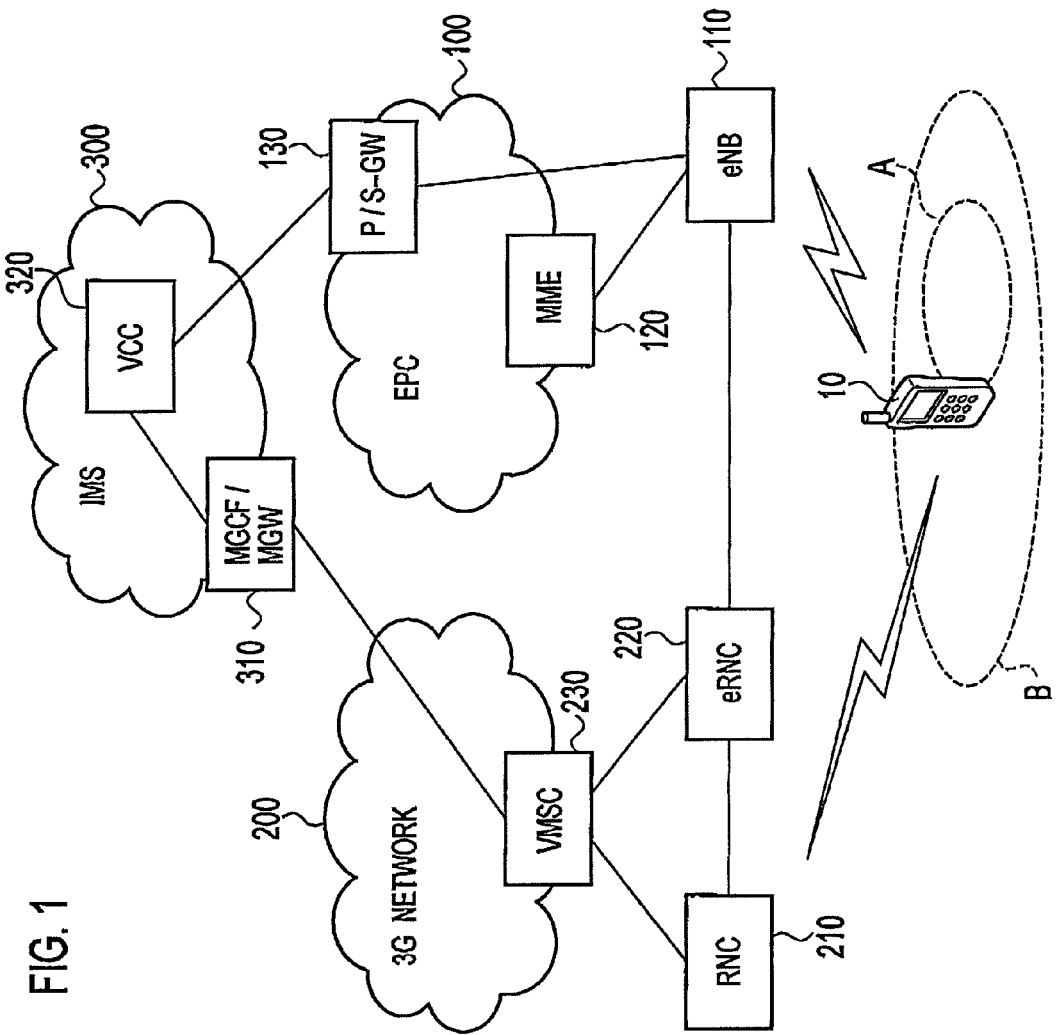
FIG. 1 is a schematic diagram showing a radio communication system according to a first embodiment.

Radio communication systems according to embodiments of the present invention will be described below referring to the drawings. Note that, in the following description of the drawings, the same or similar parts will be denoted by the same or similar reference numerals.

It should be noted, however, that the drawings are schematic, and that the dimensional proportions and the like are different from their actual values. Accordingly, specific dimensions and the like should be inferred based on the description given below. Moreover, dimensional relationships and proportions may differ from one drawing to another in some parts, of course.

First Embodiment (Outline of Radio Communication System)

An outline of a radio communication system according to a first embodiment will be described below with reference to the drawings. FIG. 1 is a schematic diagram showing the radio communication system according to the first embodiment.

It should be noted that FIG. 1 shows only the components required for description of the first embodiment. Therefore, it should be noted that an HLR (Home Location Register) and the like are actually provided in the radio communication system in addition to the configuration shown in FIG. 1.

As shown in FIG. 1, the radio communication system includes a mobile station 10, an eNB 110, an MME 120, a P/S-GW 130, an RNC 210, an eRNC 220, a VMSC 230, an MGCF/MGW 310 and a VCC 320.

It should be noted here that the eNB 110, the MME 120 and the P/S-GW 130 forms a next-generation radio communication system. The MME 120 and the P/S-GW 130 are provided on an EPC 100 (Evolved Packet Core). The EPC 100 is a core network of the next-generation radio communication system.

In the next-generation radio communication system, LTE (Long Term Evolution), SAE (System Architecture Evolution) or the like is used. The next-generation radio communication system may be referred to as "Super 3G", "3.9 Generation" or the like.

It should be noted, on the other hand, that the RNC 210, the eRNC 220 and the VMSC 230 forms a third-generation radio communication system. The VMSC 230 is provided on a 3G network 200. The 3G network 200 is a core network of the third-generation radio communication system.

The third-generation radio communication system has a circuit switching domain and a packet switching domain. The circuit switching domain will be mainly described in the first embodiment.

The mobile station 10 is configured to be connectable to the EPC 100 through the eNB 110. Moreover, the mobile station 10 is configured to be connectable to the 3G network 200 through a base station (not shown) and the RNC 210. It should be noted, however, that the mobile station 10 can be connected to only one of the EPC 100 and the 3G network 200.

Specifically, the mobile station 10 is configured to be connectable to the next-generation radio communication system and the third-generation radio communication system separately.

When moving from an area A to an area B, the mobile station 10 can perform a handover from the next-generation radio communication system to the third-generation radio communication system. Similarly, when moving from the area B to the area A, the mobile station 10 can perform a handover from the third-generation radio communication system to the next-generation radio communication system.

What is mainly considered in the first embodiment is a case of performing a handover from the next-generation radio communication system to the third-generation radio communication system (circuit switching domain). Note that the mobile station 10 will be described in detail later (see FIG. 2).

The eNB 110 is a radio station (evolved NODE B) which manages the area A and which sets a radio connection with the mobile station 10 located in the area A. The eNB 110 is configured to transmit information on the mobile station 10 to the eRNC 220. The eNB 110 is also configured to receive information between the eRNC 220 and the mobile station 10 from the eRNC 220.

For example, the eNB 110 uses a radio connection set between the mobile station 10 and the eNB 110 to transmit the information on the mobile station 10 to the eRNC 220. On the other hand, the eNB 110 receives from the eRNC 220 parameters to be used in a radio connection to be set between the mobile station 10 and the RNC 210.

The parameters include security parameters such as a random number (FRESH), a ciphering algorithm, an integrity protection algorithm, and message authentication code information (MAC-I), which are used to detect interpolation of various messages. Note that the security parameter is selected according to mobile station security information.

Moreover, the parameters also include radio parameters such as "RNTI", "RAB info" and "RB Configuration". Note that the message authentication code information (MAC-I) is added to a message and compared with information (XMAC-I) generated from the message. When MAC-I and XMAC-I correspond to each other, the message is considered to be not interpolated. On the other hand, when MAC-I and XMAC-I do not correspond to each other, the message is considered to be interpolated.

The MME 120 is a device (Mobility Management Entity) which is connected to the eNB 110 and manages mobility of the mobile station 10 that has set a radio connection with the eNB 110.

The P/S-GW 130 is a general term for a PDN-GW (Packet Data Network Gateway) and an S-GW (Serving Gateway). The PDN-GW and S-GW may be separately provided, of course.

The PDN-GW is a gateway provided on a boundary between the EPC 100 and an external network (Public Data Network), and performs processing of assigning an IP address to the mobile station 10, or the like. In the first embodiment, the PDN-GW is connected to an IMS 300. The S-GW is a gateway which terminates a signal from the mobile station 10 within the EPC 100.

The RNC 210 is a radio station (Radio Network Controller) which manages the area B and sets a radio connection with the mobile station 10 located in the area B. The RNC 210 sets a parameter used in the radio connection set between the mobile station 10 and the RNC 210.

The eRNC 220 is a radio station (Evolved Radio Network Controller) which is connected to the RNC 210 and the VMSC 230. The eRNC 220 is configured to transparently exchange information with the eNB 110.

For example, the eRNC 220 transmits the parameter used in the radio connection set between the mobile station 10 and the RNC 210 to the eNB 110. On the other hand, the eRNC 220 receives a parameter used in the radio connection set between the mobile station 10 and the eNB 110 from the eNB 110.

The VMSC 230 is a switch (Visited Mobile Switching Center) configured to perform circuit switching in the circuit switching domain.

The MGCF/MGW 310 is a general term for an MGCF (Media Gateway Control Function) and an MGW (Media Gateway). The MGCF and MGW may be separately provided, of course.

The MGCF is provided on a C-PLANE and has a function of controlling the MGW. The MGW is provided on a U-PLANE and performs conversion of a Codec method for voice information, QoS (Quality of Service) control, and the like. The MGW has a function of switching communication methods such as STM (Synchronous Transport Mode), ATM (Asynchronous Transport Mode) and IP (Internet Protocol).

The VCC 320 has an application (Voice Call Continuity Application) for switching the C-PLANE that is a path of control information such as call control information when the radio communication system to which the mobile station 10 is connected is switched.

Note that the MGCF/MGW 310 and the VCC 320 forms the IMS 300 (IP Multimedia Subsystem).

(Configuration of Mobile Station)

Figure 2:
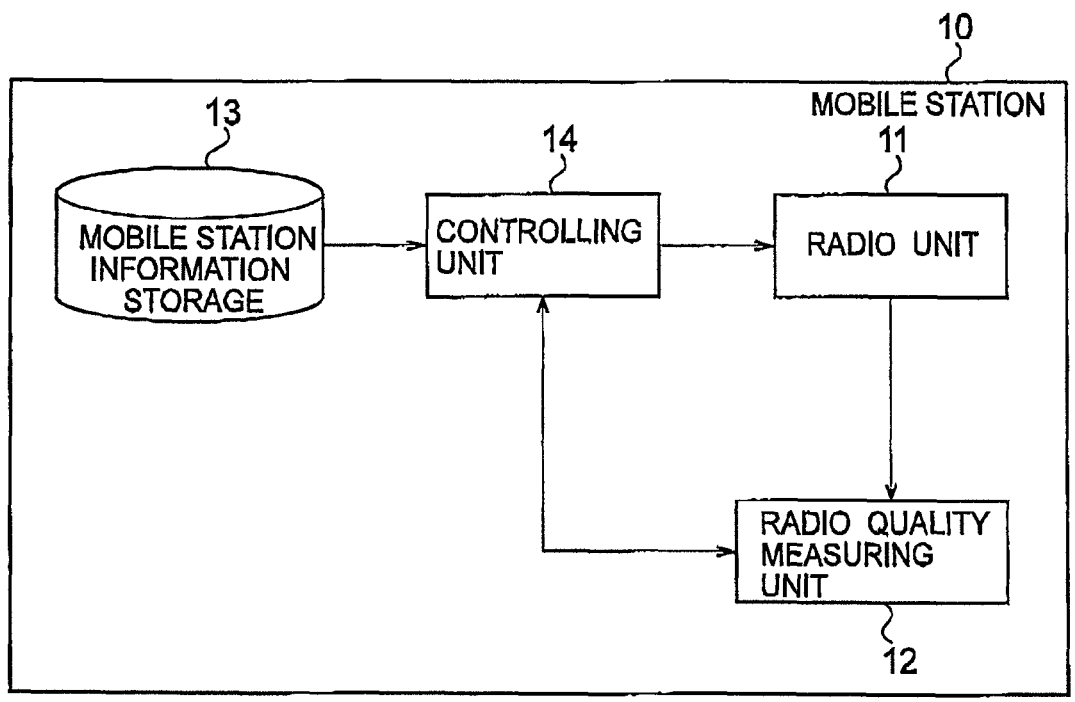
FIG. 2 is a block diagram showing a configuration of a mobile station 10 according to the first embodiment.

A configuration of the mobile station according to the first embodiment will be described below with reference to the drawings. FIG. 2 is a block diagram showing the configuration of the mobile station 10 according to the first embodiment.

As shown in FIG. 2, the mobile station 10 includes a radio unit 11, a radio quality measuring unit 12, a mobile station information storage 13 and a controlling unit 14.

The radio unit 11 has an antenna and the like, and performs processing of setting a radio connection with the eNB 110. The radio unit 11 also performs processing of setting a radio connection with the RNC 210. However, the radio unit 11 can set a radio connection with only one of the eNB 110 and the RNC 210.

The radio unit 11 has a function of transmitting various kinds of information to the eNB 110 or the RNC 210. The radio unit 11 also has a function of receiving various kinds of information from the eNB 110 or the RNC 210.

The radio quality measuring unit 12 measures radio quality of the area A managed by the eNB 110. Specifically, the radio quality measuring unit 12 measures quality of a signal received from the eNB 110 (such as a reception level of a downlink reference signal, pathloss, SIR and BLER) as the radio quality of the area A. It should be noted that the radio quality measuring unit 12 can measure the radio quality of the area A even when the radio connection with the eNB 110 is not set.

Moreover, the radio quality measuring unit 12 measures radio quality of the area B managed by the RNC 210. Specifically, the radio quality measuring unit 12 measures quality of a signal received from a base station (not shown) provided under the control of the RNC 210 (such as a reception level of a common pilot channel (CPICH), pathloss, Ec/NO, SIR and BLER) as the radio quality of the area B. It should be noted that the radio quality measuring unit 12 can measure the radio quality of the area B even when the radio connection with the RNC 210 is not set.

The mobile station information storage 18 stores mobile station capability information indicating the capability of the mobile station 10 in each of the communication systems. The mobile station capability information includes mobile station security information, "MS Classmark" and the like. Specifically, the mobile station security information indicates security capabilities of the mobile station 10, and "MS Classmark" indicates additional service capability of the mobile station 10, a frequency band supported by the mobile station 10, and, the like. The mobile station security information is, for example, information indicating a cipher algorithm that can be processed by the mobile station 10 and a message authentication algorithm (integrity algorithm).

The controlling unit 14 performs overall control of the operations of the mobile station 10. For example, the controlling unit 14 instructs the radio unit 11 to transmit the mobile station capability information in response to a request from the radio communication system. The controlling unit 14 also instructs the radio unit 11 to transmit a measurement result of the radio quality measured by the radio quality measuring unit 12.

(Operations of Radio Communication System)

Figure 3:
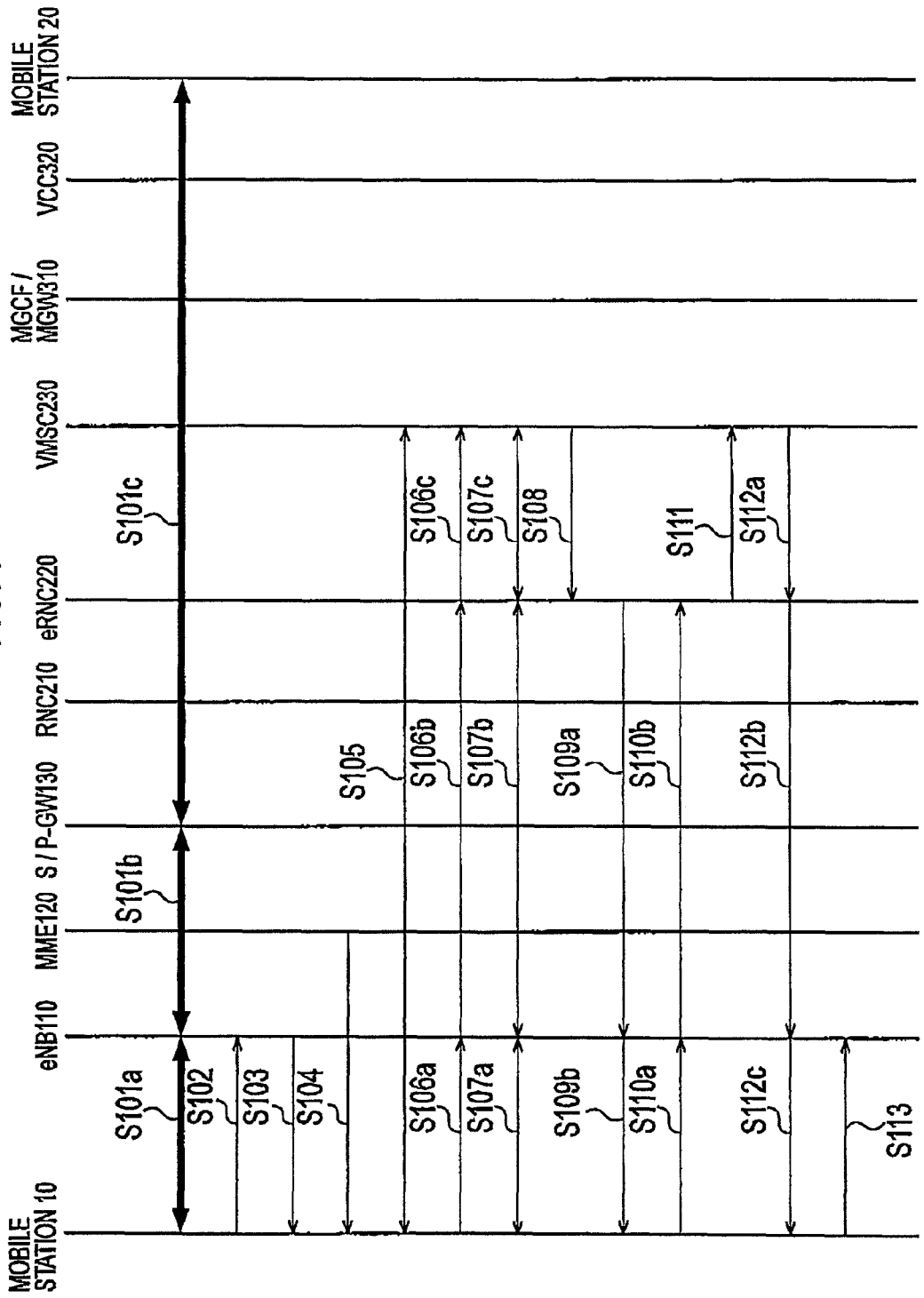
FIG. 3 is a sequence diagram showing operations of the radio communication system according to the first embodiment.
Figure 4:
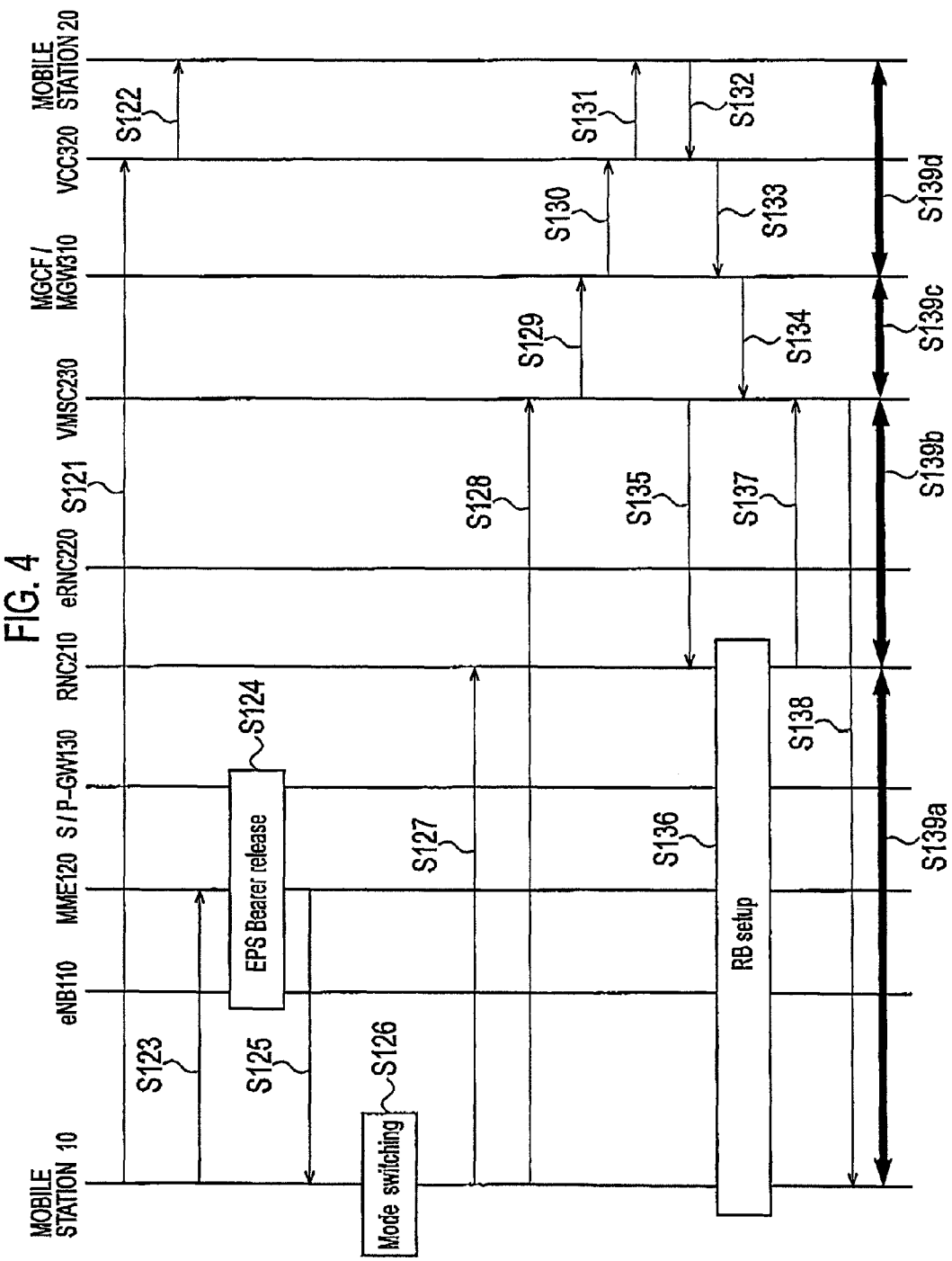
FIG. 4 is a sequence diagram showing operations of the radio communication system according to the first embodiment.

Operations of the radio communication system according to the first embodiment will be described below with reference to the drawings. FIGS. 3 and 4 are sequence diagrams showing operations of the radio communication system according to the first embodiment.

Note that, as described above, what is considered in the first embodiment is the case of performing a handover from the next-generation radio communication system to the third-generation radio communication system (circuit switching domain).

As shown in FIG. 3, in Steps 101a to 101c, the mobile station 10 is connected to the next-generation radio communication system and communicates with a mobile station 20 via the next-generation radio communication system. In the first embodiment, a description is given assuming that the mobile station 10 performs voice communication with the mobile station 20.

In Step 102, the mobile station 10 measures radio quality of the area A managed by the eNB 110, and then transmits a measurement report on the radio quality of the area A to the eNB 110.

In Step 103, the eNB 110 transmits information (Measurement Control) instructing measurement of radio quality of the area B (Inter-RAT Measurement) to the mobile station 10. Note that the mobile station 10 measures radio quality of the area B and then transmits a measurement report on the radio quality of the area B to the eNB 110.

In Step 104, the MME 120 transmits information instructing execution of security procedures of the third generation radio communication system by use of the next-generation radio communication system (LTE) to the mobile station 10.

In Step 105, the mobile station 10 transmits its own identifier (IMSI; International Mobile Subscriber Identity) to the VMSC 230 (IMSI attach).

In Steps 106a to 106c, the mobile station 10 transmits security service requesting information (CM Service Request) to the VMSC 230. The security service requesting information includes a TMSI (Temporary Mobile Subscriber Identity), a CKSN (Cypher Key Sequence Number) and mobile station capability information (MS Classmark and mobile station security information). As described above, the mobile station security information is the information indicating security capabilities of the mobile station 10. "MS Classmark" is the information indicating additional service capability of the mobile station 10, a frequency band supported by the mobile station 10, and the like.

Here, in Step 106a, the mobile station 10 transmits a "CM Service Request" to the eNB 110 through a radio connection set between the mobile station itself and the eNB 110. In Step 106b, the eNB 110 transmits the "CM Service Request" to the eRNC 220. In Step 106c, the eRNC 220 transmits the "CM Service Request" to the VMSC 230.

In Steps 107a to 107c, authentication processing of the mobile station 10 is performed between the mobile station 10 and the VMSC 230. In the authentication processing, the radio connection set between the mobile station 10 and the eNB 110 is used as in the case of Steps 106a to 106c. Note that the authentication processing may be omitted.

In Step 108, the VMSC 230 sets various security parameters according to the mobile station capability information (mobile station security information). For example, the VMSC 230 sets a UIA (UTMS Integrity Algorithm), an IK (Integrity Key), a UEA (UTMS Encryption Algorithm), a CK (Cypher Key) and the like. Subsequently, the VMSC 230 transmits information containing various security parameters (Security Mode Command) to the eRNC 220.

In Steps 109a to 109b, the eRNC 220 acquires a random number (FRESH) and message authentication code information (MAC-I) from the RNC 210 and then transmits information (Security Mode Command) containing the acquired random number and information to the mobile station 10. The "Security Mode Command" contains the UIA and UEA set by the VMSC 230 in addition to the FRESH and MAC-I.

Here, in Step 109a, the eRNC 220 transmits the "Security Mode Command" to the eNB 110. In Step 109b, the eNB 110 transmits the "Security Mode Command" to the mobile station 10 through the radio connection set between the mobile station 10 and the eNB 110.

In Steps 110a to 110b, the mobile station 10 selects a UIA and a UEA used in the third-generation radio communication system from among the UIAs and UEAs set by the VMSC 230. Subsequently, the mobile station 10 transmits information indicating that message authentication is enabled in the third-generation radio communication system (Security Mode Complete) to the eRNC 220. The "Security Mode Complete" contains the UIA and UEA selected by the mobile station 10, and the like.

Here, in Step 110a, the mobile station 10 transmits the "Security Mode Complete" to the eNB 110 through the radio connection set between the mobile station itself and the eNB 110. In Step 110b, the eNB 110 transmits the "Security Mode Complete" to the eRNC 220.

In Step 111, the eRNC 220 transmits the information (Security Mode Complete) containing the UIA and UEA selected by the mobile station 10 to the VMSC 230.

In Steps 112a to 112c, the VMSC 230 transmits information indicating that a security service request has been accepted (CM Service Accept) to the mobile station 10.

Here, in Step 112a, the VMSC 230 transmits the "CM Service Accept" to the eRNC 220. In Step 112b, the eRNC 220 transmits the "CM Service Accept" to the eNB 110. In Step 112c, the eNB 110 transmits the "CM Service Accept" to the mobile station 10 through the radio connection set between the mobile station 10 and the eNB 110.

In Step 113, the mobile station 10 transmits information indicating that the security procedures of the third-generation radio communication system using the next-generation radio communication system (LTE) are completed to the MME 120.

As shown in FIG. 4, in Step 121, the mobile station 10 transmits information notifying that a handover from the next-generation radio communication system to the third-generation radio communication system is to be performed to the VCC 320.

In Step 122, the VCC 320 transmits information notifying that the mobile station 10 is performing the handover to prevent the mobile station 20 from disconnecting the voice communication during the handover to the mobile station 20.

In Step 123, the mobile station 10 transmits information requesting release of the radio connection set between the mobile station itself and the eNB 110 (EPS Bearer deactivation) to the MME 120.

In Step 124, the eNB 110, the MME 120 and the P/S-GW 130 release the radio connection set between the mobile station 10 and the eNB 110 (EPS Bearer release).

In Step 125, the MME 120 transmits information notifying that the radio connection set between the mobile station 10 and the eNB 110 has been released (EPS Bearer deactivation ack.) to the mobile station 10.

In Step 126, the mobile station 10 switches the mode from the next-generation radio communication system to the third-generation radio communication system.

In Step 127, the mobile station 10 and the RNC 210 set a transmission path (C-PLANE) of control information between the mobile station 10 and the RNC 210 (RRC Connection).

In Step 128, the mobile station 10 transmits information (Setup) containing a switching number for identifying the voice communication performed between the mobile stations 10 and 20 to the VMSC 230. As the switching number, a mobile station identifier of the mobile station 10 or the mobile station 20, a call control number, or the like can be used.

In Step 129, the VMSC 280 transmits information requesting a host address to be assigned to the mobile station 10 (IAM; Initial Address Message) to the MGCF/MGW 810.

In Step 130, the MGCF/MGW 310 transmits information requesting a call of the mobile station 20 (Invite) to the VCC 320.

In Step 131, the VCC 320 transmits information requesting a call of the mobile station 20 (Re-Invite) to the mobile station 20.

In Step 132, the mobile station 20 transmits information notifying that the call of the mobile station itself has been accepted (200 OK) to the VCC 320.

In Step 133, the VCC 320 transmits information notifying that the call of the mobile station 20 has been accepted (200 OK) to the MGCF/MGW 310.

In Step 134, the MGCF/MGW 310 transmits information notifying that a radio connection (U-PLANE) has been set between the mobile stations 10 and 20 (ANM; Answer Message) to the VMSC 230.

In Step 135, the VMSC 230 transmits information requesting a radio connection to be set between the mobile station 10 and the RNC 210 (RAB Setup req.) to the RNC 210.

In Step 136, the mobile station 10 and the RNC 210 set a radio connection between the mobile station 10 and the RNC 210 using the security information set in Steps 106 to 111 (FRESH, MAC-I, UEA and UIA selected by the mobile station 10).

In Step 137, the RNC 210 transmits information notifying that the radio connection has been set between the mobile station 10 and the RNC 210 (RAB Setup resp.) to the VMSC 230.

In Step 138, the VMSC 230 transmits information notifying that the U-PLANE has been set between the mobile stations 10 and 20 (CONNECT) to the mobile station 10.

In Steps 139*a* to 139*d*, the mobile station 10 starts voice communication with the mobile station 20 via the third-generation radio communication system.

Advantageous Effects

According to the first embodiment, in the case of performing a handover from the next-generation radio communication system to the third-generation radio communication system, the mobile station 10 acquires a parameter (e.g., such as FRESH, MAC-I, UFA, and UIA) used in a radio connection to be set between the mobile station itself and the RNC 210 before the disconnection of the radio connection set between the mobile station itself and the eNB 110.

Specifically, before the disconnection of the radio connection set between the mobile station 10 and the eNB 110, the security procedures of the third-generation radio communication system are previously performed. Therefore, it is not required to perform the security procedures of the third-generation radio communication system after the disconnection of the radio connection set between the mobile station 10 and the eNB 110. Thus, it is possible to shorten a period of time for which the radio connection is disconnected during the handover.

Second Embodiment

A second embodiment will be described below with reference to the drawings. The following description will be mainly given of differences between the first embodiment described above and the second embodiment.

To be more specific, in the first embodiment described above, in the handover from the next-generation radio communication system to the third-generation radio communication system, the security procedures of the third-generation radio communication system are executed before the disconnection of the radio connection set between the mobile station 10 and the next-generation radio communication system.

On the other hand, in the second embodiment, in the handover from the next-generation radio communication system to the third-generation radio communication system, not only the security procedures of the third-generation radio communication system but also relocation processing of passing quality of service to the third-generation radio communication system is performed before the disconnection of the radio connection set between the mobile station 10 and the next-generation radio communication system. Specifically, the quality of service is required for the voice communication already performed using the next-generation radio communication system.

(Outline of Radio Communication System)

Figure 5:
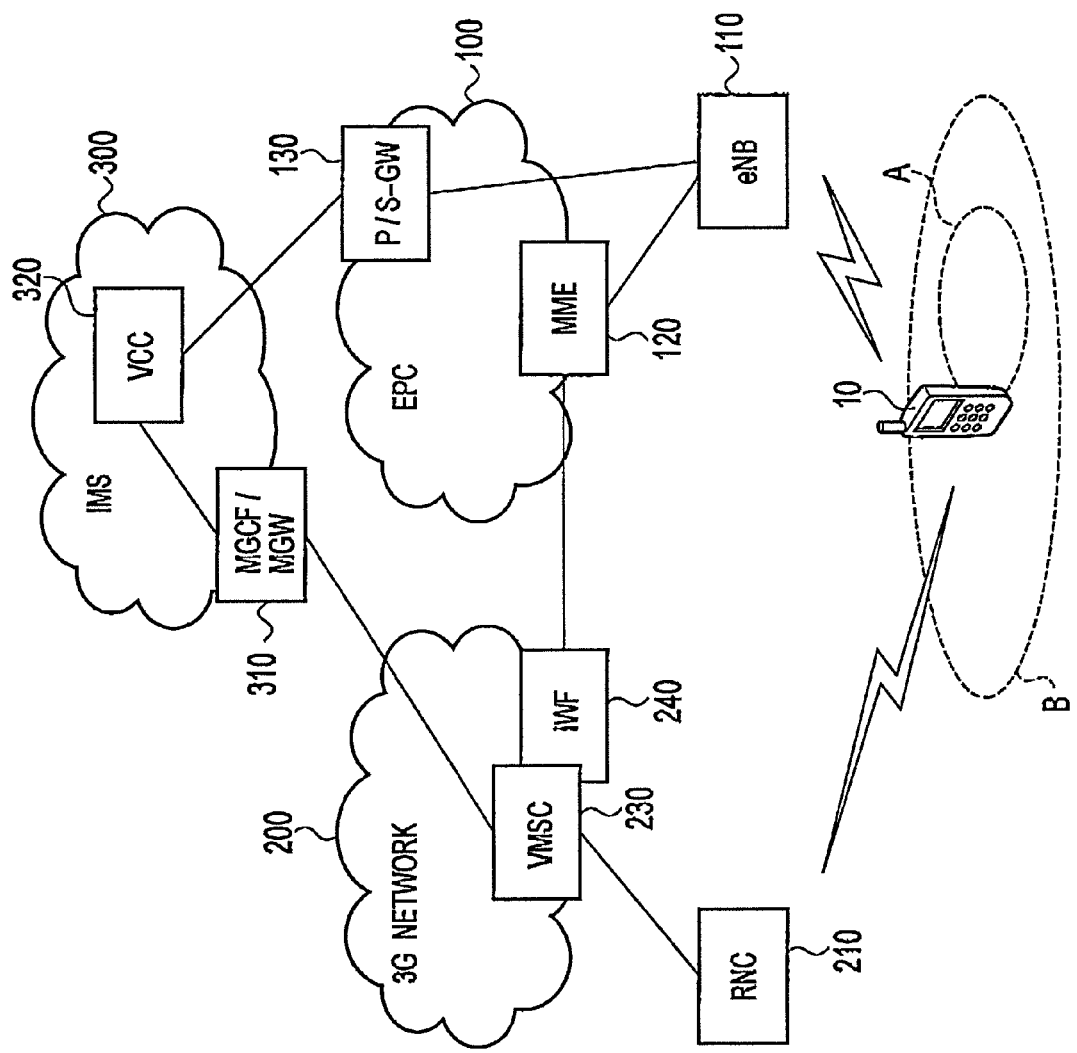
FIG. 5 is a schematic diagram showing a radio communication system according to a second embodiment.

An outline of a radio communication system according to a second embodiment will be described below with reference to the drawings. FIG. 5 is a schematic diagram showing the radio communication system according to the second embodiment. It should be noted that, in FIG. 5, the same components as those of FIG. 1 described above are denoted by the same reference numerals.

As shown in FIG. 5, the radio communication system includes an IWF 240 instead of the eRNC 220. Note that the VMSC 230 and the IWF 240 may be provided in the same device.

The IWF 240 has a function of exchanging information with the MME 120 (Interworking Function). For example, the IWF 240 transmits to the eNB 110 a parameter (parameter generated in the third-generation radio communication system) used in a radio connection set between the mobile station 10 and the RNC 210. On the other hand, the IWF 240 receives from the eNB 110 a parameter (parameter generated in the EPC and LTE) used in the radio connection set between the mobile station 10 and the eNB 110.

(Operations of Radio Communication System)

Figure 6:
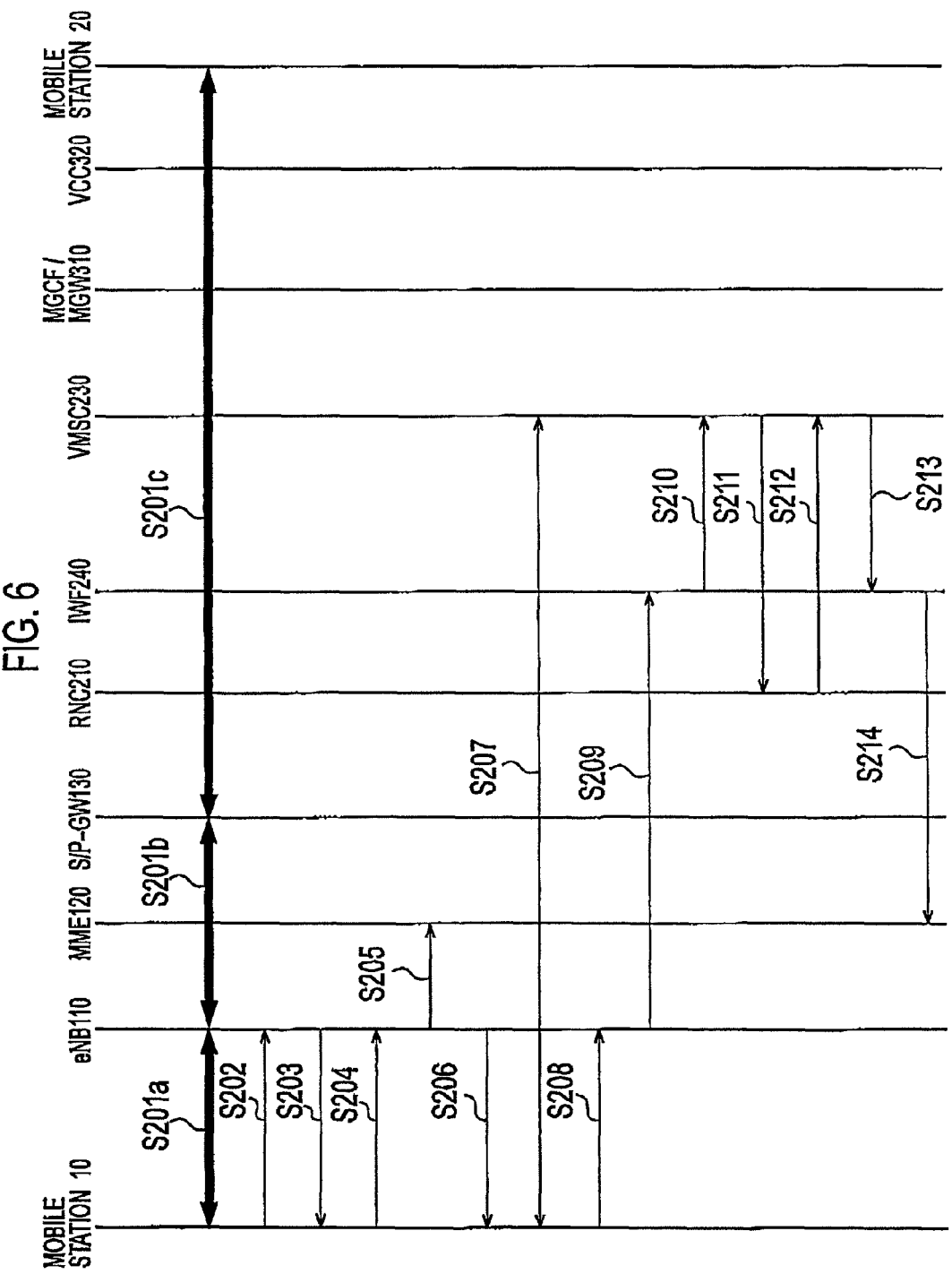
FIG. 6 is a sequence diagram showing operations of the radio communication system according to the second embodiment.
Figure 7:
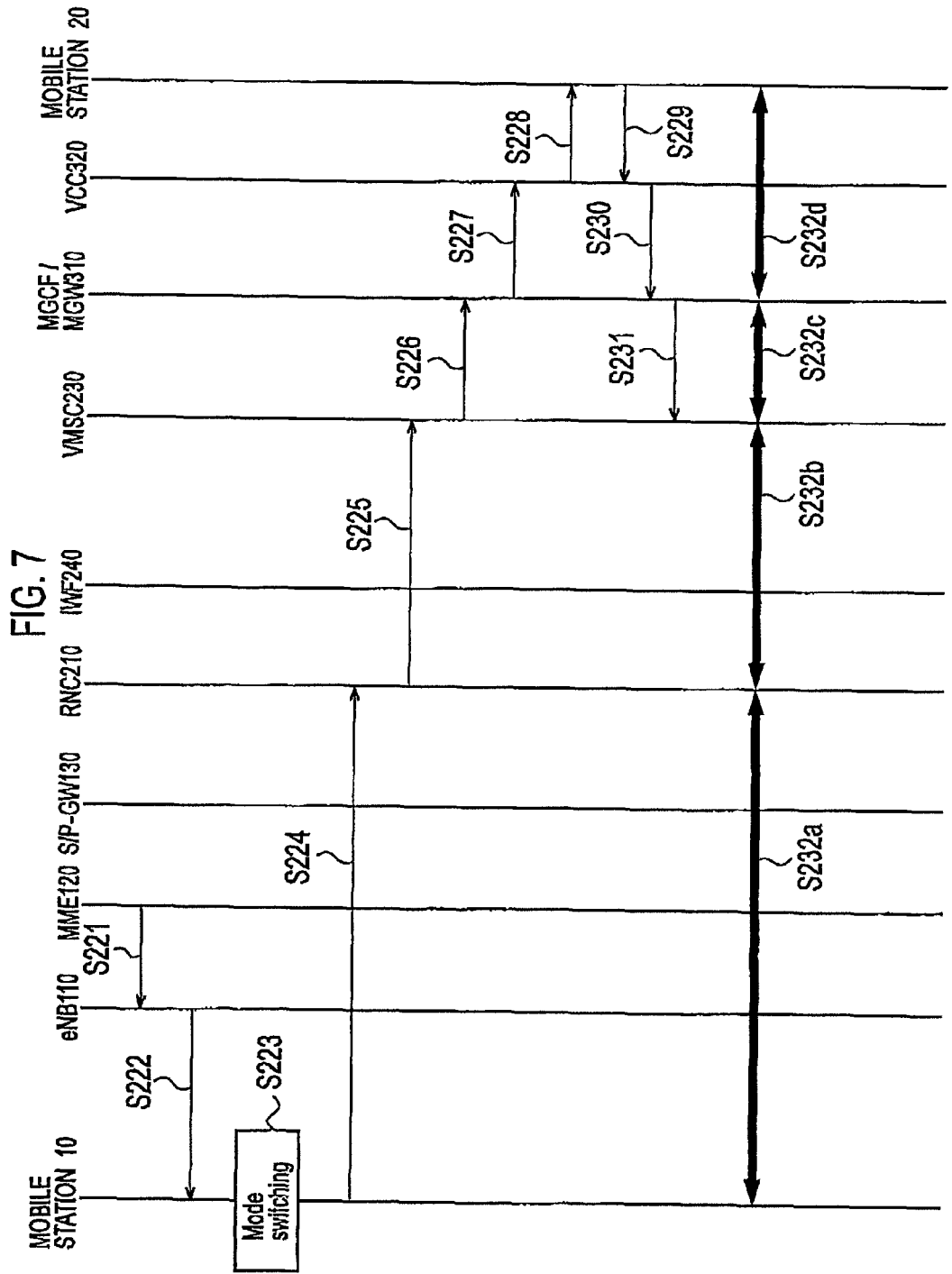
FIG. 7 is a sequence diagram showing operations of the radio communication system according to the second embodiment.

Operations of the radio communication system according to the second embodiment will be described below with reference to the drawings. FIGS. 6 and 7 are sequence diagrams showing operations of the radio communication system according to the second embodiment.

Note that what is considered in the second embodiment is a case of performing a handover from the next-generation radio communication system to the third-generation radio communication system (circuit switching domain), as in the first embodiment.

As shown in FIG. 6, in Steps 201*a* to 201*c*, the mobile station 10 is connected to the next-generation radio communication system and communicates with a mobile station 20 via the next-generation radio communication system. In the second embodiment, a description is given assuming that the mobile station 10 performs voice communication with the mobile station 20.

In Step 202, the mobile station 10 measures radio quality of an area A managed by the eNB 110, and then transmits a measurement report on the radio quality of the area A to the eNB 110.

In Step 203, the eNB 110 transmits information (Measurement Control) instructing measurement of radio quality of the area B (Inter-RAT Measurement) to the mobile station 10. Here, the "Measurement Control" contains information requesting transmission of mobile station capability information (mobile station security information and "MS Classmark") on the mobile station 10.

In Step 204, the mobile station 10 measures radio quality of the area B and then transmits a measurement report on the radio quality of the area B to the eNB 110. Here, the "Measurement Report" contains the mobile station capability information (mobile station security information and "MS Classmark").

In Step 205, the eNB 110 transmits information requesting relocation processing from the area A to the area B (Relocation Required) to the MME 120. Here, the "Relocation Required" contains the measurement report on the radio quality of the area B, the identifier of the mobile station 10 (S-TMSI; SAE-Temporary Mobile Subscriber Identity), and the mobile station capability information (mobile station security information and "MS Classmark"). Note that the S-TMSI is the identifier for temporarily identifying a user in the next-generation radio communication system.

In Step 206, the MME 120 transmits information instructing execution of security procedures of the third-generation radio communication system and relocation processing by use of the next-generation radio communication system (LTE) to the mobile station 10.

In Step 207, the mobile station 10 transmits its own identifier (IMSI; International Mobile Subscriber Identity) to the VMSC 230 (IMSI attach). Note that, if the "IMSI attach processing" has already been executed, the processing of Step 207 may be omitted.

In Step 208, the mobile station 10 transmits information indicating that the attach processing to the third-generation radio communication system (VMSC 230) is completed to the MME 120.

In Step 209, the MME 120 transmits information requesting relocation processing from the area A to the area B (Forward Relocation Request) to the IWF 240. Here, the "Forward Relocation Request" contains quality-of-service information (QoS) indicating quality of service required for the voice communication already performed using the next-generation radio communication system, and the identifier (IMSI) of the mobile station 10. Moreover, the "Forward Relocation Request" further contains the mobile station capability information (mobile station security information and "MS Classmark") on the mobile station 10.

In Step 210, the IWF 240 transmits information instructing preparation of a handover from the next-generation radio communication system to the bird-generation radio communication system (handover preparation instruction) to the VMSC 230.

In Step 211, the VMSC 230 transmits information requesting relocation processing from the area A to the area B (Relocation Request) to the RNC 210.

In Step 212, the RNC 210 sets a random number (FRESH) and message authentication code information (MAC-I) and then transmits information (Relocation Response) containing the acquired random number and information to the VMSC 230.

In Step 213, the VMSC 230 sets various parameters according to the mobile station capability information (mobile station security information and "MS Classmark") and then transmits information containing the various parameters (handover preparation instruction_response) to the IWF 240. Here, the various parameters include UIA, IK, UEA, CK and the like. The "handover preparation instruction_response" contains the random number (FRESH) and message authentication code information (MAC-I) set by the RNC 210.

In Step 214, the IWF 240 transmits a response to the "Forward Relocation Request" (Forward Relocation Response) to the MME 120. The "Forward Relocation Response" contains the various parameters set by the VMSC 230 and the random number (FRESH) and message authentication code information (MAC-I) set by the RNC 210.

Note that the security procedures and preparation of relocation processing are completed by the processing of Step 214.

In Step 221, the MME 120 transmits information requesting relocation from the area A to the area B (Relocation Command) to the eNB 110. The "Relocation Command" contains the various parameters set by the VMSC 230 and the random number (FRESH) and message authentication code information (MAC-I) set by the RNC 210.

In Step 222, the eNB 110 transmits information instructing a handover from the next-generation radio communication system to the third-generation radio communication system (HO Command) to the mobile station 10. Here, the "HO Command" contains "RNTI", "RAB info", "RB Configuration", security information, and the like. The security information contains the various security parameters (UEA and UIA) set by the VMSC 230, and the FRESH and MAC-I set by the RNC 210.

In Step 223, the mobile station 10 switches the mode from the next-generation radio communication system to the third-generation radio communication system.

In Step 224, the mobile station 10 sets a radio connection between the mobile station 10 and the RNC 210 using the information received in Step 222 (such as "MAC-I", "FRESH", "UEA", "UIA", "RNTI", "RAB info", "RB Configuration"). Subsequently, the mobile station 10 transmits information notifying that the handover from the next-generation radio communication system to the third-generation radio communication system is completed (HO complete) to the RNC 210.

In Step 225, the RNC 210 transmits information notifying that the relocation processing from the area A to the area B is completed (Relocation Complete) to the VMSC 230.

In Step 226, the VMSC 230 transmits information requesting a host address to be assigned to the mobile station 10 (IAM; Initial Address Message) to the MGCF/MGW 310.

In Step 227, the MGCF/MGW 310 transmits information requesting a call of the mobile station 20 (Invite) to the VCC 320.

In Step 228, the VCC 320 transmits information requesting a call of the mobile station 20 (Re-Invite) to the mobile station 20.

In Step 229, the mobile station 20 transmits information notifying that the call of the mobile station itself has been accepted (200 OK) to the VCC 320.

In Step 230, the VCC 320 transmits information notifying that the call of the mobile station 20 has been accepted (200 OK) to the MGCF/MGW 810.

In Step 231, the MGCF/MGW 310 transmits information notifying that U-PLANE has been set between the mobile stations 10 and 20 (ANM; Answer Message) to the VMSC 230.

In Steps 232a to 232d, the mobile station 10 starts voice communication with the mobile station 20 via the next-generation radio communication system.

Advantageous Effects

According to the second embodiment, as in the case of the first embodiment, the security procedures of the third-generation radio communication system and notification of the radio parameters to the mobile station 10 are previously performed before the disconnection of the radio connection set between the mobile station 10 and the eNB 110. Thus, it is possible to shorten a period of time for which the radio connection is disconnected during the handover.

Third Embodiment

A third embodiment will be described below with reference to the drawings. The following description will be mainly given of differences between the first embodiment described above and the third, embodiment.

To be more specific, the handover from the next-generation radio communication system to the third-generation radio communication system (circuit switching domain) has been discussed in the above first embodiment.

On the other hand, in the third embodiment, after a handover from the next-generation radio communication system to a third-generation radio communication system (packet switching domain) is performed, a handover from the third-generation radio communication system (packet switching domain) to a third-generation radio communication system (circuit switching domain) is performed.
(Outline of Radio Communication System)

Figure 8:
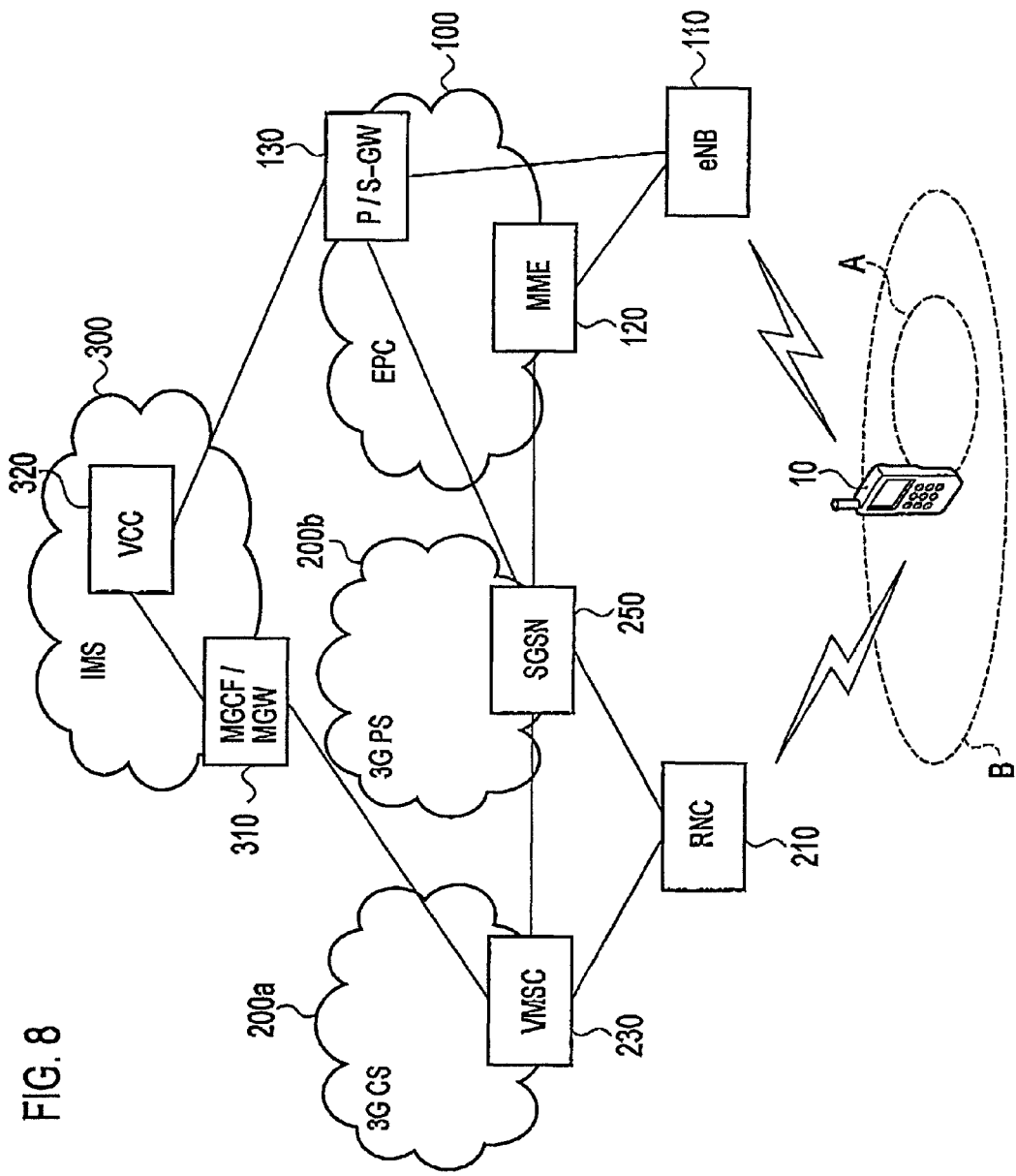
FIG. 8 is a schematic diagram showing a radio communication system according to a third embodiment.

An outline of a radio communication system according to a third embodiment will, be described below with reference to the drawings. FIG. 8 is a schematic diagram showing the radio communication system according to the third embodiment. It should be noted that, in FIG. 8, the same components as those of FIG. 1 described above are denoted by the same reference numerals.

As shown in FIG. 8, a 3G network 200 has a circuit switching domain 200a and a packet switching domain 200b. The VMSC 280 is provided in the circuit switching domain 200a, whereas an SGSN 250 is provided in the packet switching domain 200b.

The SGSN 250 is a device (Serving GPRS Support Node) configured to perform packet switching in the packet switching domain 200b. The SGSN 250 is connected to the MME 120 and the P/S-GW 130, and can exchange various kinds of information with the MME 120 and the P/S-GW 130.
(Operations of Radio Communication System)

Figure 9:
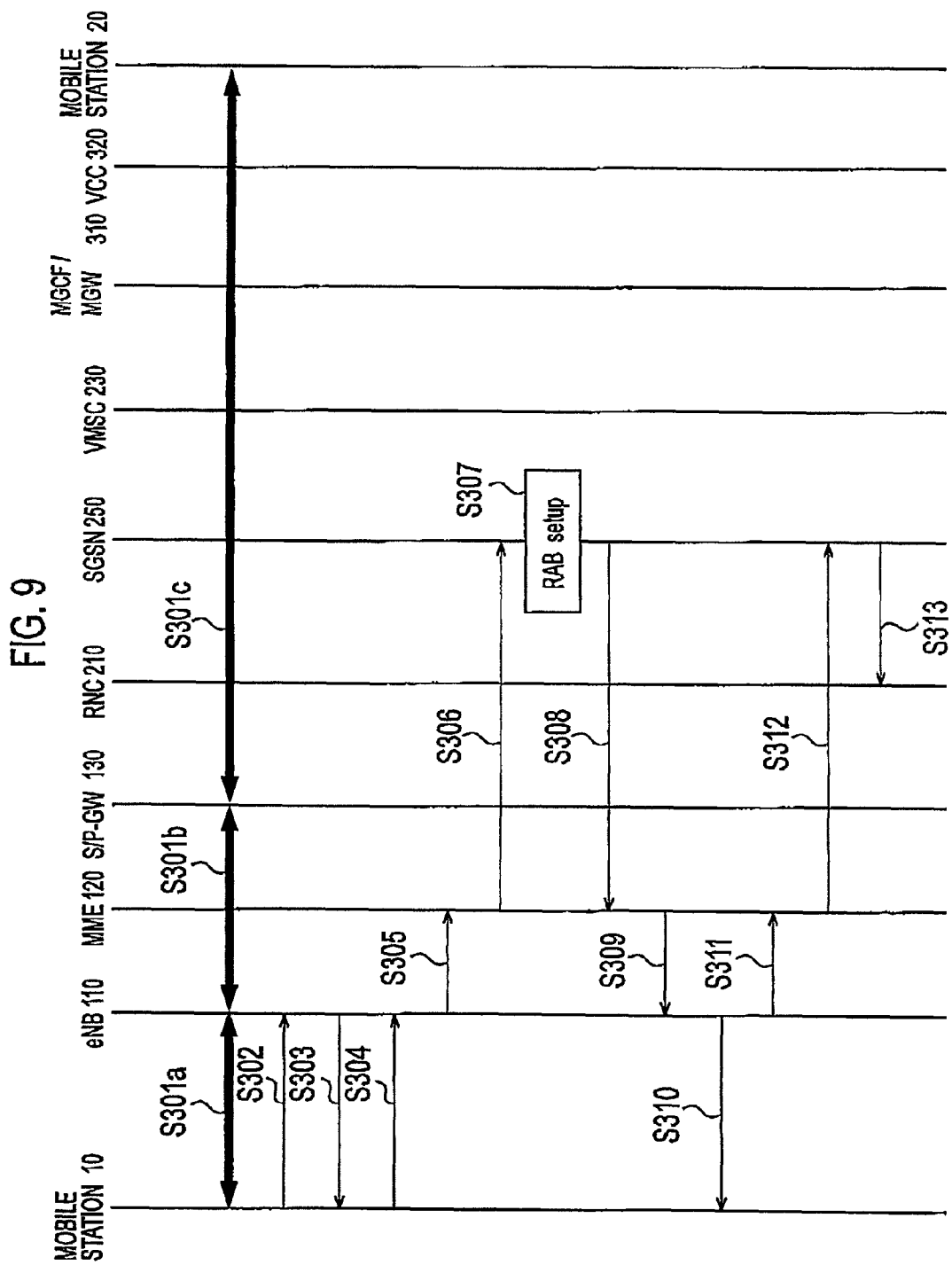
FIG. 9 is a sequence diagram showing operations of the radio communication system according to the third embodiment.
Figure 10:
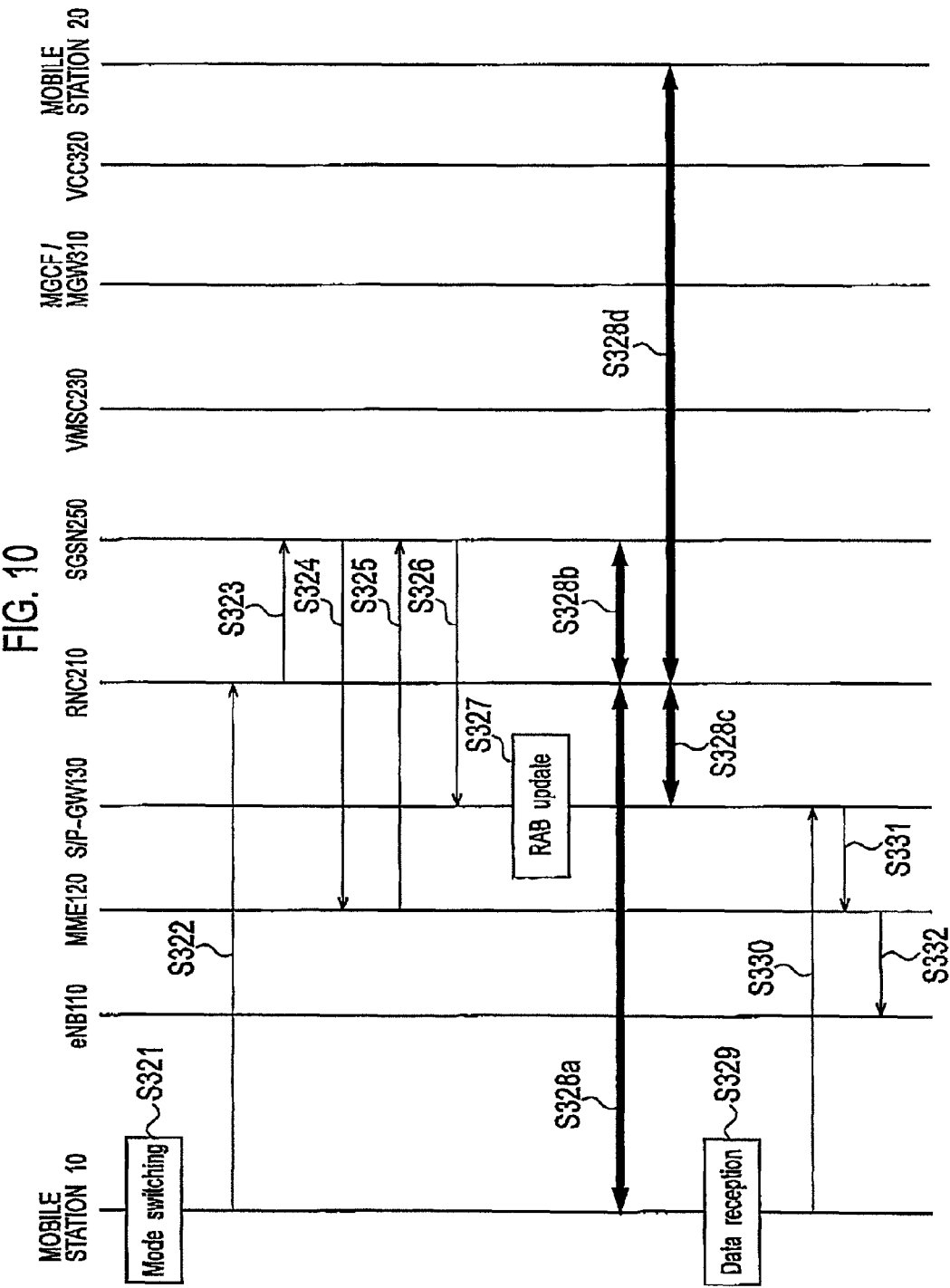
FIG. 10 is a sequence diagram showing operations of the radio communication system according to the third embodiment.
Figure 11:
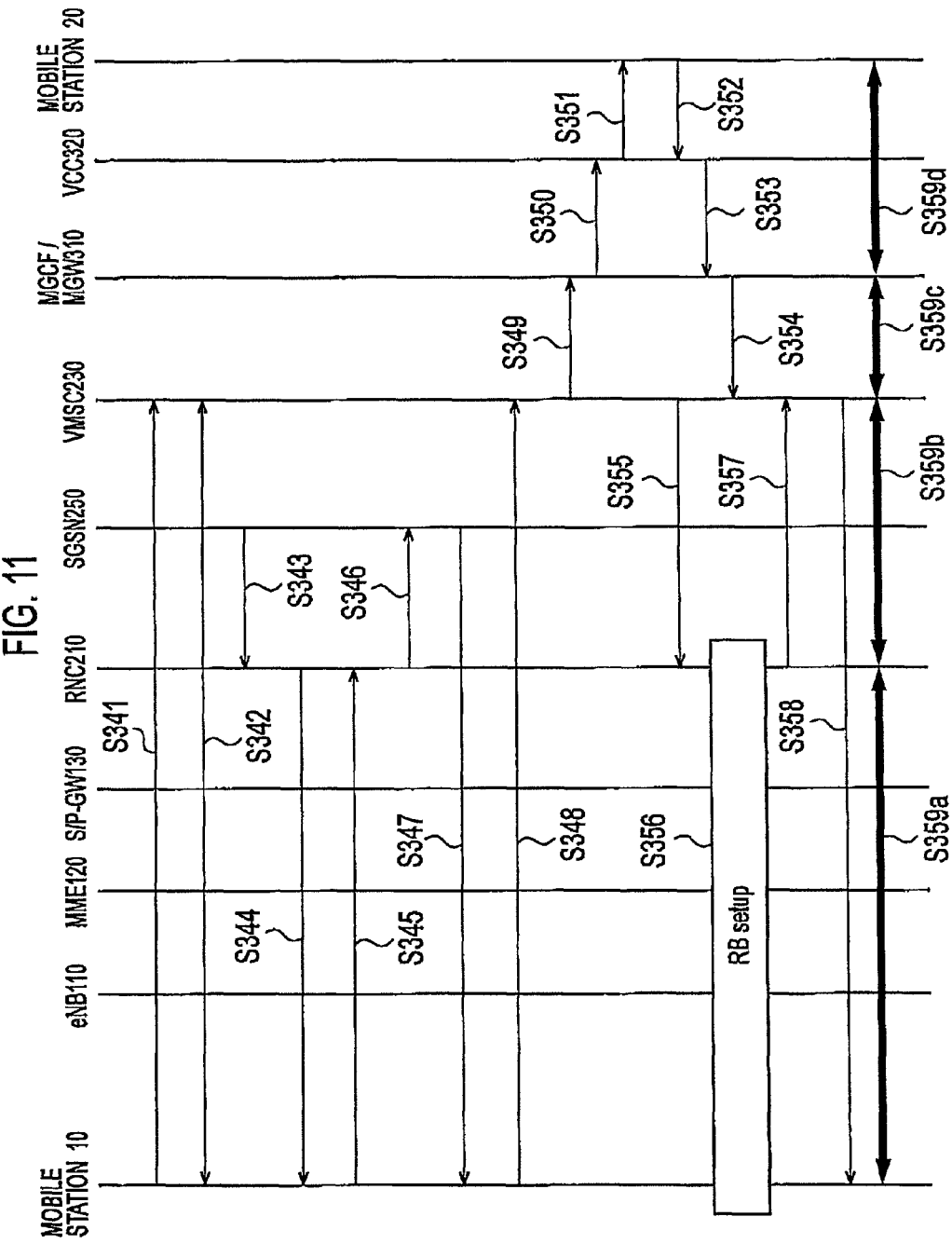
FIG. 11 is a sequence diagram showing operations of the radio communication system according to the third embodiment.

Operations of the radio communication system according to the third embodiment will be described below with reference to the drawings. FIGS. 9 to 11 are sequence diagrams showing operations of the radio communication system according to the second embodiment.

Note that, as described above, what is considered in the third embodiment is the case where, after a handover from the next-generation radio communication system to a third-generation radio communication system (packet switching domain) is performed, a handover from the third-generation radio communication system (packet switching domain) to a third-generation radio communication system (circuit switching domain) is performed.

As shown in FIG. 9, in Steps 301a to 301c, the mobile station 10 is connected to the next-generation radio communication system and communicates with a mobile station 20 via the next-generation radio communication system. In the third embodiment, a description is given assuming that the mobile station 10 performs voice communication with the mobile station 20.

In Step 302, the mobile station 10 measures radio quality of an area A managed by the eNB 110, and then transmits a measurement report on the radio quality of the area A to the eNB 110.

In Step 303, the eNB 110 transmits information (Measurement Control) instructing measurement of radio quality of the area B (Inter-RAT Measurement) to the mobile station 10. Here, the "Measurement Control" contains information requesting transmission of mobile station capability information (mobile station security information and "MS Classmark") on the mobile station 10.

In Step 304, the mobile station 10 measures radio quality of the area B and then transmits a measurement report on the radio quality of the area B to the eNB 110. Here, the "Measurement Report" contains the mobile station capability information (mobile station security information and "MS Classmark").

In Step 305, the eNB 110 transmits information requesting relocation processing from the area A to the area B (Relocation Required) to the MME 120. Here, the "Relocation Required" contains the measurement report on the radio quality of the area B, the identifier of the mobile station 10 (S-TMSI; Secondary-Temporary Mobile Subscriber Identity), and the mobile station capability information (mobile station security information and "MS Classmark").

In Step 306, the MME 120 transmits information requesting relocation processing from the area A to the area B (Forward Relocation Request) to the SGSN 250. Here, the "Forward Relocation Request" contains quality-of-service information (QoS) indicating quality of service required for the voice communication already performed using the next-generation radio communication system, and the identifier (IMSI) of the mobile station 10. Moreover, the "Forward Relocation Request" further contains the mobile station capability information (mobile station security information and "MS Classmark") on the mobile station 10.

In Step 307, the RNC 210 and the SGSN 250 set a bearer for exchanging various kinds of information between the RNC 210 and the SGSN 250 (RABs Establishment). Here, the SGSN 250 sets various parameters according to the mobile station capability information (mobile station security information). The RNC 210 sets a random number (FRESH) and message authentication code information (MAC-I).

In Step 308, the SGSN 250 transmits a response to the "Forward Relocation Request" (Forward Relocation Response) to the MME 120. The "Forward Relocation Response" contains the various parameters set by the SGSN 250 and the random number (FRESH) and message authentication code information (MAC-I) set by the RNC 210.

These pieces of information are used for the security procedures of the packet switching domain 200b.

In Step 309, the MME 120 transmits information requesting relocation from the area A to the area B (Relocation Command) to the eNB 110. The "Relocation Command" contains the various parameters set by the SGSN 250 and the random number (FRESH) and message authentication code information (MAC-I) set by the RNC 210.

In Step 310, the eNB 110 transmits information instructing a handover from the next-generation radio communication system to the third-generation radio communication system (packet switching domain 200b) (HO Command) to the mobile station 10. Here, the "HO Command" contains "RNTI", "RAB info", "RB Configuration", security information, and the like. The security information contains the various parameters (UEA and UIA) set by the VMSC 230, and the FRESH and MAC-I set by the RNC 210.

In Step 311, the eNB 110 transmits "Forward SRNS Context" to the MME 120.

In Step 312, the MME 120 transmits "Forward SRNS Context" to the SGSN 250.

In Step 313, the SGSN 250 transmits "Forward SRNS Context" to the RNC 210.

In Step 321, the mobile station 10 switches the mode from the next-generation radio communication system to the third-generation radio communication system.

In Step 322, the mobile station 10 sets a radio connection between the mobile station 10 and the RNC 210 using the information received in Step 310 (such as "MAC-I", "FRESH", "UEA", "UIA", "RNTI", "RAB info", "RB Configuration"). Subsequently, the mobile station 10 transmits information notifying that the handover from the next-generation radio communication system to the third-generation radio communication system (packet switching domain 200b) is completed (HO complete) to the RNC 210.

In Step 323, the RNC 210 transmits information notifying that the relocation processing from the area A to the area B is completed (Relocation Complete) to the SGSN 250.

In Step 324, the SGSN 250 transmits information notifying that the relocation processing from the area A to the area B is completed (Forward Relocation Complete) to the MME 120.

In Step 325, the MME 120 transmits information indicating that the "Forward Relocation Complete" has been accepted (Forward Relocation Complete ack.) to the SGSN 250.

In Step 326, the SGSN 250 transmits information requesting updating of PDP contexts (Update PAP Contxts req.) to the P/S-GW 130.

In Step 327, the P/S-GW 130 switches the radio connection of the mobile station 10 according to the "Update PDP Contxts req.". Specifically, the P/S-GW 130 switches the radio connection set between the mobile station 10 and the eNB 110 to the radio connection newly set between the mobile station 10 and the RNC 210.

In Steps 328a to 328d, the mobile stations 10 and 20 perform voice communication through the newly set radio connection (U-PLANE set on the packet switching domain 200b).

In Step 329, the mobile station 10 receives voice data through the newly set radio connection (U-PLANE set on the packet switching domain 200b).

In Step 330, the mobile station 10 transmits security service requesting information (CM Service Request) to the P/S-GW 130. The "CM Service Request" includes a TMSI (Temporary Mobile Subscriber Identity), a CKSN (Cypher Key Sequence Number) and the like.

In Step 331, the P/S-GW 130 transmits information notifying that updating of the radio connection is completed (Update Bearer Complete) to the MME 120.

In Step 332, the MME 120 and the eNB 110 release the radio connection set between the mobile station 10 and the eNB 110.

In Step 341, the mobile station 10 transmits information requesting security service in the circuit switching domain 200a (CM Service Request) to the VMSC 230. The security service requesting information includes a TMSI (Temporary Mobile Subscriber Identity) and a CKSN (Cypher Key Sequence Number).

In Step 342, authentication processing of the mobile station 10 is performed between the mobile station 10 and the VMSC 230. Note that the authentication processing may be omitted.

In Step 343, the SGSN 250 acquires, from the VMSC 230, the various parameters set according to the mobile station capability information (mobile station security information) and then transmits information containing the various parameters (Security Mode Command) to the RNC 210. The various parameters include UIA, IK, UEA, CK and the like. These pieces of information are used in the circuit switching domain 200a.

In Step 344, the RNC 210 sets a random number (FRESH) and message authentication code information (MAC-I) and then transmits information (Security Mode Command) containing the acquired random number and information to the mobile station 10. The "Security Mode Command" contains the UIA and UEA set by the VMSC 230 in addition to the FRESH and MAC-I.

In Step 345, the mobile station 10 selects a UIA and a UEA used in the third-generation radio communication system from among the UIAs and UEAs set by the VMSC 230. Subsequently, the mobile station 10 transmits information indicating that message authentication is enabled in the third-generation radio communication system (Security Mode Complete) to the RNC 210. The "Security Mode Complete" contains the MAC-I, UIA, UEA, and the like.

In Step 346, the RNC 210 transmits the information (Security Mode Complete) containing the UIA and UEA selected by the mobile station 10 to the VMSC 230.

In Step 347, the VMSC 230 transmits information indicating that a security service request has been accepted (CM Service Accept) to the mobile station 10.

In Step 348, the mobile station 10 transmits information (Setup) containing a switching number for identifying the voice communication performed between the mobile stations 10 and 20 to the VMSC 230. As the switching number, a mobile station identifier of the mobile station 10 or the mobile station 20, a call control number, or the like can be used.

In Step 349, the VMSC 230 transmits information requesting a host address to be assigned to the mobile station 10 (IAM; Initial Address Message) to the MGCF/MGW 310.

In Step 350, the MGCF/MGW 310 transmits information requesting a call of the mobile station 20 (Invite) to the VCC 320.

In Step 351, the VCC 320 transmits information requesting a call of the mobile station 20 (Re-Invite) to the mobile station 20.

In Step 352, the mobile station 20 transmits information notifying that the call of the mobile station itself has been accepted (200 OK) to the VCC 320.

In Step 353, the VCC 320 transmits information notifying that the call of the mobile station 20 has been accepted (200 OK) to the MGCF/MGW 310.

In Step 354, the MGCF/MGW 310 transmits information notifying that a U-PLANE has been set between the mobile stations 10 and 20 (ANM; Answer Message) to the VMSC 230.

In Step 355, the VMSC 230 transmits information requesting a radio connection to be set between the mobile station 10 and the RNC 210 (RAB Setup req.) to the RNC 210.

In Step 356, the mobile station 10 and the RNC 210 set a radio connection between the mobile station 10 and the RNC 210 using the security information set in Steps 341 to 346 (FRESH, MAC-I, UEA and UIA selected by the mobile station 10).

In Step 357, the RNC 210 transmits information notifying that the radio connection has been set between the mobile station 10 and the RNC 210 (RAB Setup resp.) to the VMSC 230.

In Step 358, the VMSC 230 transmits information notifying that the U-PLANE has been set between the mobile stations 10 and 20 (CONNECT) to the mobile station 10.

In Steps 359a to 359d, the mobile station 10 starts voice communication with the mobile station 20 via the third-generation radio communication system (circuit switching domain).

Note that the radio connection in the packet switching domain is released after the processing of Steps 359a to 359d.

Advantageous Effects

According to the third embodiment, as in the case of the first embodiment, the security procedures of the packet switching domain 200b are previously performed before the disconnection of the radio connection set between the mobile station 10 and the eNB 110. Thus, it is possible to shorten a period of time for which the radio connection is disconnected during the handover.

According to the third embodiment, upon receipt of the voice data through the packet switching domain 200b, the mobile station 10 starts a handover from the packet switching domain 200b to the circuit switching domain 200a.

Therefore, after a handover from the next-generation radio communication system to the packet switching domain 200b is performed, a handover from the packet switching domain 200b to the circuit switching domain 200a can be smoothly started.

Particularly, since it is clear when to start the handover from the packet switching domain 200b to the circuit switching domain 200a, the handover can be smoothly started even if the application of the mobile station 10 does not know the kind of the network to which the mobile station 10 is connected.

Other Embodiments

The present invention has been described above using the embodiments of the present invention. It should be understood, however, that the descriptions and the drawings that constitute part of the disclosure do not limit the present invention. This disclosure will make various alternative embodiments, examples, and operation techniques apparent to those skilled in the art.

For example, although described as such in the above embodiments, the present invention is not limited to the handover from the next-generation radio communication system to the third-generation radio communication system. Specifically, the present invention may be implemented to a handover from the third-generation radio communication system to the next-generation radio communication system.

Moreover, the kinds of the radio communication system are not limited to the third-generation radio communication system and the next-generation radio communication system. For example, the present invention may be implemented to a WLAN and the like.

Although described as such in the above embodiments, the present invention is not limited to the voice communication. Specifically, the present invention may be implemented to data communication.

Furthermore, although described as such in the above second embodiment, the present invention is not limited to a case where the information requesting transmission of the mobile station capability information (mobile station security information and "MS Classmark") on the mobile station 10 is contained in the information (Measurement Control) instructing measurement of radio quality of the area B (Inter-RAT Measurement). Specifically, the information requesting transmission of the mobile station capability information (mobile station security information and "MS Classmark") on the mobile station 10 may be transmitted to the mobile station 10 before and after the "Measurement Control".

Although not particularly mentioned in the above embodiments, the next-generation radio communication system may previously acquire the mobile station capability information (mobile station security information and "MS Classmark") from the mobile station 10 and manage the mobile station capability information before the start of the handover from the next-generation radio communication system to the third-generation radio communication system. For example, the eNB 110 or the MME 120 may manage the mobile station capability information.

For example, when the mobile station 10 has executed the attach processing to the next-generation radio communication system, the next-generation radio communication system may acquire the mobile station capability information on the mobile station 10 in the third-generation radio communication system.

In such a case, during the handover from the next-generation radio communication system to the third-generation radio communication system, there is no need to newly request transmission of the mobile station capability information in the third-generation radio communication system.

Furthermore, although described as such in the above embodiments, the present invention is not limited to a case where the various security parameters are set on the network side according to the mobile station capability information (mobile station security information). Specifically, the various security parameters may be previously designated values.

INDUSTRIAL APPLICABILITY

The present invention can provide a radio communication system, a radio communication method, and a mobile station, which are capable of shortening a period of time for which a radio connection is disconnected during a handover.

The invention claimed is:
1. A radio communication system comprising
a first radio communication system,
a second radio communication system and
a mobile station connectable to the first radio communication system and the second radio communication system separately, the mobile station configured to perform a handover from the first radio communication system to the second radio communication system, wherein
the mobile station transmits mobile station capability information to the first radio communication system via a first radio connection set between the mobile station and the first radio communication system, before a disconnection of the first radio connection, the mobile station capability information indicating the capability of the mobile station in the second radio communication system, the first radio communication system transmits the mobile station capability information to the second radio communication system, before the disconnection of the first radio connection, the second radio communication system transmits a parameter to the first radio communication system, before the disconnection of the first radio connection, the parameter being used in a second radio connection to be set between the mobile station and the second radio communication system, the first radio communication system transmits the parameter to the mobile station via the first radio connection, before the disconnection of the first radio connection, the second radio communication system includes a circuit switching domain and a packet switching domain, the handover is a handover from the first radio communication system to the packet switching domain, and upon receipt of data via the packet switching domain, and the mobile station starts the handover from the packet switching domain to the circuit switching domain.

2. The radio communication system according to claim 1, wherein
the mobile station measures radio quality of the second radio communication system, and then transmits the mobile station capability information to the first radio communication system together with a measurement report on the radio quality of the second radio communication system.

3. The radio communication system according to claim 2, wherein
the first radio communication system starts relocation processing in response to the measurement report on the radio quality of the second radio communication system,
the relocation processing causing the second radio communication system to take over quality-of-service information indicating quality of service required for the communication already performed using the first radio communication system, and
in the relocation processing, the first radio communication system transmits the parameter to the mobile station together with a handover request to execute the handover.

4. The radio communication system according to claim 1, wherein
the mobile station measures radio quality of the first radio communication system, and then transmits a measurement report on the radio quality of the first radio communication system to the first radio communication system, and
the first radio communication system transmits, to the mobile station, a request for transmitting the mobile station capability information, in response to the measurement report on the radio quality of the first radio communication system.

5. The radio communication system according to claim 1, wherein
the mobile station previously transmits the mobile station capability information before starting the handover, and
the first radio communication system transmits in the handover, to the second radio communication system, the mobile station capability information previously received from the mobile station.

6. A radio communication method applied for a first radio communication system, a second radio communication system and a mobile station connectable to the first radio communication system and the second radio communication system separately, the method causing the mobile station to perform a handover from the first radio communication system to the second radio communication system, the method comprising the steps of
transmitting mobile station capability information from the mobile station to the first radio communication system via a first radio connection set between the mobile station and the first radio communication system before a disconnection of the first radio connection, the mobile station capability information indicating the capability of the mobile station in the second radio communication system;
transmitting the mobile station capability information from the first radio communication system to the second radio communication system, before the disconnection of the first radio connection;
transmitting a parameter from the second radio communication system to the first radio communication system, before the disconnection of the first radio connection, the parameter being used in a second radio connection to be set between the mobile station and the second radio communication system; and
transmitting the parameter from the first radio communication system to the mobile station via the first radio connection, before the disconnection of the first radio connection, wherein
the second radio communication system includes a circuit switching domain and a packet switching domain,
the handover is a handover from the first radio communication system to the packet switching domain, and upon receipt of data via the packet switching domain,
the mobile station starts the handover from the packet switching domain to the circuit switching domain.

7. A mobile station which is connectable to a first radio communication system and a second radio communication system separately, and which performs a handover from the first radio communication system to the second radio communication system, comprising:
a transmitting unit configured to transmit mobile station capability information to the second radio communication system via the first radio communication system, before a disconnection of a first radio connection set between the mobile station itself and the first radio communication system, the mobile station capability information indicating the capability of the mobile station itself in the second radio communication system; and
a receiving unit configured to receive a parameter from the second radio communication system via the first radio communication system, before the disconnection of the first radio connection, the parameter being used in a second radio connection to be set between the mobile station itself and the second radio communication system, wherein
the second radio communication system includes a circuit switching domain and a packet switching domain,
the handover is a handover from the first radio communication system to the packet switching domain, and upon receipt of data via the packet switching domain,
the mobile station starts the handover from the packet switching domain to the circuit switching domain.

* * * * *